United States Patent Office 2,822,890
Patented Feb. 11, 1958

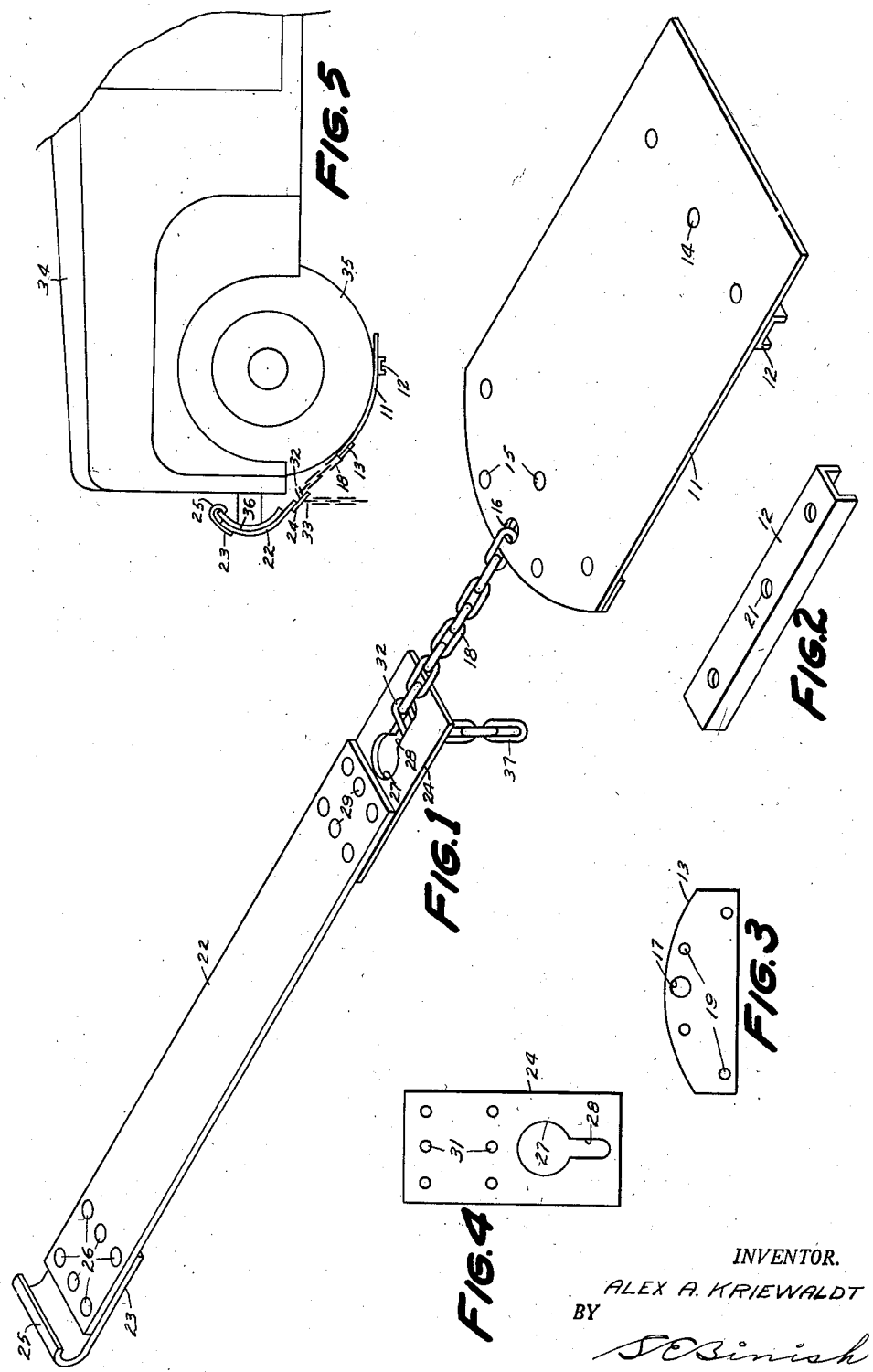

2,822,890

CHOCK BRAKE

Alex A. Kriewaldt, Oconto, Wis.

Application November 18, 1955, Serial No. 547,691

2 Claims. (Cl. 188—32)

This invention relates generally to an improvement in automobile braking devices, and more particularly to a chock type brake therefor.

The use of jacks, particularly bumper jacks, in the maintenance and repair of vehicles, such as automobiles, or the like, produce a dangerous situation in that the lifting operation of the jacks often causes the vehicle to suddenly shift its position, with the possibility of damage to the vehicle, or injury to the operator.

Chock brakes, of the friction shoe type, interposed between the road or supporting surface and the tread of tires or wheels, and anchored to the vehicle, are known to eliminate the above dangerous situation when applied to vehicles generally. However, none of the presently known chock brakes are adaptable or suitable to the modern designed automobile with its inaccessible undercarriage to which the chock might be anchored and its highly polished surfaces which deter the thought of any such device bearing thereagainst.

The purpose of this invention is to provide a pliable chock brake removably engageable with an automobile bumper, and harmlessly bearable against the highly polished surface thereof.

An object of this invention is the provision of a chock brake adapted to be easily anchored to an automobile bumper.

Another object is to provide a chock brake that will not mar, deface, chip or otherwise damage the highly polished plating prevalent on automobile bumpers on which it is to bear.

Still another object of this invention is the provision of a chock brake embodying a soft, pliable bearing strap for conforming to the contour of an automobile bumper with which it is associated.

Yet, another object is to provide a chock brake embodying a soft, pliable bearing strap for distributing its bearing stresses harmlessly over a broad bumper area.

A further object of this invention is the provision of a chock brake having a pliable brake shoe for conforming to the curvature of a superimposed tire or wheel thereon, whereby to receive anchoring forces tangentially and in tension only.

Still a further object is to provide a chock brake having simple engageable chain and slot adjusting means.

Yet a further object of this invention is the provision of a chock brake hookedly anchorable to a conventional automobile bumper.

Another object is to provide a chock brake embodying pliable members foldable into a very small compact unit.

Still another object of this invention is the provision of a foldable chock brake of simple construction and light in weight that is inexpensive to manufacture, durable and efficient in operation.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is a perspective view of a preferred embodiment of the invention;

Fig. 2 is a perspective view of a cleat element embodied in the device fo Figure 1;

Fig. 3 is a plan view of stress distributing plate embodied in the device;

Fig. 4 is a plan view of a slotted chain-receiving element embodied in the device; and Fig. 5 illustrates the application of the device to an automobile bumper and wheel.

Referring now to the drawings, wherein like reference characters designate like or corresponding parts throughout the several views, there is shown in Fig. 1 a brake shoe 11 made of pliable material such as foldable leather or the like, provided with a transverse channel-iron friction cleat 12 disposed rearwardly on the under or working side thereof, and a stress distributing plate 13 on the forward end thereof. The cleat 12 and stress plate 13 are fixed to the shoe by means of spaced rivets 14 and 15, respectively.

Registered apertures 16 and 17 in the shoe and stress plate, respectively, are provided on the longitudinal axis thereof to receive a chain 18 linked therethrough.

Apertures 19 and 21 in the stress plate 13 and cleat 12, registering with companion apertures in the leather brake shoe 11, receive said rivets 15 and 14, respectively.

An anchor strap 22 made of pliable material such as foldable leather or the like, is provided on its forward end with a hooked plate 23, and on its rearward end with a slotted, chain engaging plate 24.

The hooked plate 23 is provided with a hooked free end portion 25; and is overlapped on and riveted to the strap end by means of rivets 26 received in registered apertures provided in said strap end and said plate 23.

The chain engaging plate 24 has its free end portion provided with a centrally located aperture 27 and longitudinal slot 28 communicating therewith. The plate is secured to the strap by means of rivets 29 received in registered apertures provided in the strap end portion and in said plate 24 as indicated at 31.

The aperture 27 is of a diameter to bodily receive link chain 18 therethrough; and the communicating slot 28, having a width considerably less in width than the diameter of the aperture 27, is adapted to somewhat loosely receive an individual chain link 32 sidewise or vertically therein, whereby to interlockably engage an adjacent following link 33 with the plate margins adjacent said slot.

Operation.—Fig. 5 shows the applicability of the brake chock to the left front portion 34 of an automobile. The shoe element 11 is laid on the road or supporting surface, directly ahead of a wheel 35, and longitudinally in the line of travel thereof, with the stress plate element portion leading.

The automobile is then driven ahead onto the chock and brought to rest thereon with the wheel axis approximately above the cleat 12.

The hooked end 25 of the anchor strap is then hookedly engaged with the upper lip of the bumper 36, the hooked end being disposed on the bumper in the plane of the wheel.

The chain end 37 is passed through aperture 27, then drawn as tight as possible, and the proper link 32 thereof disposed sidewise in the slot 28. Obviously, the adjacent following link 33 will interlockingly abut and engage with the wall margins of the slot, thereby providing a chain length adjustment and positive locking means thereof.

In the event a slight slack exists in the chain, the automobile may be driven slightly further ahead until the chain becomes taut.

Then, as usual, a jack may be used in the vicinity of the other wheels, without fear that the automobile will suddenly shift ahead.

To guard against rearward shifting of the automobile, the same procedure may be followed in applying the chock brake to a rear wheel and associated portion of a rear bumper.

When the jack has served its purpose and is removed, the wheel is driven rearwardly off the chock, and the hook 25 is disengaged from the bumper. This completes the cycle of application and removal of the chock from the automobile.

To store or ship the device, the leather brake shoe and leather anchor strap can be folded or rolled into as small a bundle as desired, and inserted into a small container for storage, shipment or mailing as required.

It is apparent that the device is simple to manufacture, and affords an inexpensive and durable means for holding a vehicle stationary under circumstances outlined.

The characteristic features of this invention are the provision of a chock brake having pliable members which are foldable and rollable into a very small unit, thereby lending itself remarkably well for packaging, shipping or mailing; a chock brake having a soft pliable member adapted to be connected to a conventional bumper and bear thereagainst without fear of damaging, marring or otherwise defacing the highly polished plated surface thereof; a chock brake having a soft pliable member adapted to conform to the contour of an automobile bumper, thereby harmlessly distributing working stresses over a large area; a chock brake shoe member of soft pliable material for conforming to the curved surface of a superimposed wheel, whereby to receive anchoring forces tangentially and in pure tension only; and a chock brake having simple chain and slot adjusting means.

Obviously, many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. A chock brake, comprising: a leather brake shoe; a first stress distributing plate on the leading edge portion thereof; a link chain connected to said plate; a channel-iron cleat disposed transversely on the underside of said shoe; a leather anchor strap of at least a length sufficient to wrap around the face side of an automobile bumper; a plate hook element on the forward end of said strap, adapted to hook over the upper lip edge of an automobile bumper; a second stress distributing plate on the rearward end of said strap; and a key-hole slot in said second plate, adapted to receive said chain in interlocking engagement therewith.

2. A chock brake, comprising: a foldable leather brake shoe; a first stress distributing plate on the leading edge portion thereof; a link chain connected to said plate, on the longitudinal axis thereof; a channel-iron cleat disposed transversely on the underside of said leather brake shoe; a leather anchor strap of at least a length sufficient to wrap around the face side of an automobile bumper; a plate hook element on the forward end of said strap, adapted to hook over the upper lip edge of an automobile bumper; a second stress distributing plate on the rearward end of said strap; an aperture in said second plate adapted to bodily receive said link chain therethrough; and an elongated slot, in said second plate, communicating with said aperture, adapted to receive an individual link of said chain, to interlockably engage an adjacent following link.

References Cited in the file of this patent

UNITED STATES PATENTS

| | | |
|---|---|---|
| 696,159 | Best | Mar. 25, 1902 |
| 919,985 | Wetzel | Apr. 27, 1909 |
| 1,392,987 | Unruh | Oct. 11, 1921 |